US007933598B1

(12) United States Patent
Agrawal et al.

(10) Patent No.: US 7,933,598 B1
(45) Date of Patent: Apr. 26, 2011

(54) METHODS AND APPARATUSES FOR EFFECTING HANDOVER IN INTEGRATED WIRELESS SYSTEMS

(75) Inventors: Satish Agrawal, Sunnyvale, CA (US); Alan Evans, Newark, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 1195 days.

(21) Appl. No.: 11/080,714

(22) Filed: Mar. 14, 2005

(51) Int. Cl.
*H04W 36/00* (2009.01)
(52) U.S. Cl. ........ 455/436; 455/552; 455/557; 455/422; 455/517; 455/418; 455/414; 455/445; 455/132; 455/426; 455/433; 455/411; 370/338; 370/353; 370/328; 370/330; 370/401; 370/310; 370/331; 370/329; 370/352
(58) Field of Classification Search .................. 455/552, 455/517, 446, 426.1, 423, 448, 418, 422.1, 455/445, 436, 414.1, 132.2, 67.11, 432.1, 455/415, 552.1, 433, 411, 132.1, 434, 456.1, 455/435.2, 426; 370/331, 329, 328, 338, 370/352, 321, 310, 395.2, 353, 401, 351; 348/14.02, E7.081
See application file for complete search history.

(56) References Cited

U.S. PATENT DOCUMENTS

| 5,101,501 | A | 3/1992 | Gilhousen et al. |
| 5,109,528 | A | 4/1992 | Uddenfeldt |
| 5,226,045 | A | 7/1993 | Chuang |
| 5,235,632 | A | 8/1993 | Raith |
| 5,260,944 | A | 11/1993 | Tomabechi |
| 5,260,988 | A | 11/1993 | Schellinger et al. |
| 5,267,261 | A | 11/1993 | Blakeney, II et al. |
| 5,327,578 | A | 7/1994 | Breeden et al. |
| 5,333,175 | A | 7/1994 | Ariyavisitakul et al. |
| 5,367,558 | A | 11/1994 | Gillig et al. |
| 5,390,233 | A | 2/1995 | Jensen et al. |

(Continued)

FOREIGN PATENT DOCUMENTS

CN 1909726 2/2007

(Continued)

OTHER PUBLICATIONS

U.S. Appl. No. 10/116,311 (Non-Final Office Action mailed: Feb. 9, 2006), filed Apr. 2, 2002, Jahangir Mohammed, Non-Final Office Action of a related pending U.S. Patent Application.

(Continued)

*Primary Examiner* — Marivelisse Santiago-Cordero
*Assistant Examiner* — Joseph Arevalo
(74) *Attorney, Agent, or Firm* — Adeli & Tollen LLP

(57) ABSTRACT

Embodiments of the invention provide methods and apparatuses for effecting handover between the licensed and unlicensed portions of an integrated wireless network. For one embodiment, prior to hand out of a communication from the unlicensed wireless system (UWS), a cell identifier associated with a user terminal is changed from the cell identifier corresponding to the internet access point to the cell identifier corresponding to the unlicensed network controller. This allows the destination MSC of the licensed wireless system (LWS) to accept and fulfill a handover request from the UWS. In accordance with an alternative embodiment of the invention, after a hand in of a communication to the UWS, a cell identifier associated with the user terminal is changed from the cell identifier corresponding to the UNC to the cell identifier corresponding to the internet access point. This change allows providing location-based services to the UT being serviced by the UWS.

34 Claims, 6 Drawing Sheets

U.S. PATENT DOCUMENTS

| | | | |
|---|---|---|---|
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,475,677 A | 12/1995 | Arnold et al. |
| 5,488,649 A | 1/1996 | Schellinger |
| 5,507,035 A | 4/1996 | Bantz et al. |
| 5,509,052 A | 4/1996 | Chia et al. |
| 5,515,420 A | 5/1996 | Urasaka et al. |
| 5,533,027 A | 7/1996 | Akerberg et al. |
| 5,594,782 A | 1/1997 | Zicker et al. |
| 5,610,969 A | 3/1997 | McHenry et al. |
| 5,634,193 A | 5/1997 | Ghisler |
| 5,640,414 A | 6/1997 | Blakeney, II et al. |
| 5,659,598 A | 8/1997 | Byrne et al. |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,812,511 A | 9/1998 | Kawamura et al. |
| 5,815,525 A | 9/1998 | Smith |
| 5,818,820 A | 10/1998 | Anderson et al. |
| 5,822,681 A | 10/1998 | Chang et al. |
| 5,822,767 A | 10/1998 | MacWilliams |
| 5,825,759 A | 10/1998 | Liu |
| 5,852,767 A | 12/1998 | Sugita |
| 5,862,345 A | 1/1999 | Okanoue |
| 5,870,677 A | 2/1999 | Takahashi et al. |
| 5,887,020 A | 3/1999 | Smith |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,960,361 A | 9/1999 | Chen |
| 5,960,364 A | 9/1999 | Dent |
| 5,987,010 A | 11/1999 | Schnizlein |
| 5,995,828 A | 11/1999 | Nishida |
| 6,016,318 A | 1/2000 | Tomoike |
| 6,035,193 A | 3/2000 | Buhrmann |
| 6,052,592 A | 4/2000 | Schellinger |
| 6,101,176 A | 8/2000 | Honkasalo |
| 6,112,080 A | 8/2000 | Anderson |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,198,941 B1 | 3/2001 | Aho et al. |
| 6,226,515 B1 | 5/2001 | Pauli |
| 6,236,852 B1 | 5/2001 | Veerasamy et al. |
| 6,243,581 B1 | 6/2001 | Jawanda |
| 6,256,511 B1 | 7/2001 | Brown |
| 6,263,211 B1 | 7/2001 | Brunner |
| 6,269,086 B1 | 7/2001 | Magana |
| 6,320,673 B1 | 11/2001 | Motosugi |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith |
| 6,415,158 B1 | 7/2002 | King |
| 6,426,819 B1 | 7/2002 | Crimmins |
| 6,430,395 B2 | 8/2002 | Arazi et al. |
| 6,445,921 B1 | 9/2002 | Bell |
| 6,463,307 B1 | 10/2002 | Larsson et al. |
| 6,493,629 B1 | 12/2002 | Van Bosch |
| 6,498,934 B1 | 12/2002 | Muller .................... 455/450 |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo |
| 6,633,614 B1 | 10/2003 | Barton et al. |
| 6,633,761 B1 | 10/2003 | Singhal |
| 6,643,512 B1 | 11/2003 | Ramaswamy |
| 6,647,426 B2 | 11/2003 | Mohammed |
| 6,658,250 B1 | 12/2003 | Ganesan et al. |
| 6,665,276 B1 | 12/2003 | Culbertson et al. |
| 6,671,506 B1 | 12/2003 | Lee |
| 6,675,009 B1 | 1/2004 | Cook |
| 6,680,923 B1 | 1/2004 | Leon |
| 6,711,400 B1 | 3/2004 | Aura |
| 6,766,160 B1 | 7/2004 | Lemilainen et al. |
| 6,788,656 B1 | 9/2004 | Smolentzov et al. |
| 6,801,519 B1 | 10/2004 | Mangal |
| 6,801,772 B1 | 10/2004 | Townend et al. |
| 6,801,777 B2 | 10/2004 | Rusch |
| 6,807,417 B2 | 10/2004 | Sallinen |
| 6,824,048 B1 | 11/2004 | Itabashi et al. |
| 6,826,154 B2 | 11/2004 | Subbiah et al. |
| 6,829,227 B1 | 12/2004 | Pitt et al. |
| 6,842,462 B1 | 1/2005 | Ramjee et al. |
| 6,845,095 B2 | 1/2005 | Krishnarajah et al. |
| 6,888,811 B2 | 5/2005 | Eaton et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,970,719 B1 | 11/2005 | McConnell et al. |
| 6,993,359 B1 | 1/2006 | Nelakanti et al. |
| 6,996,087 B2 | 2/2006 | Ejzak |
| 7,009,952 B1 | 3/2006 | Razavilar et al. |
| 7,039,027 B2 | 5/2006 | Bridgelall |
| 7,054,627 B1 | 5/2006 | Hillman |
| 7,069,022 B2 | 6/2006 | Rajaniemi et al. |
| 7,127,250 B2 * | 10/2006 | Gallagher et al. ............ 455/436 |
| 7,171,199 B1 * | 1/2007 | Rahman ...................... 455/433 |
| 7,307,963 B2 | 12/2007 | Chow et al. |
| 7,356,145 B2 | 4/2008 | Ala-Laurila et al. |
| 7,369,859 B2 | 5/2008 | Gallagher |
| 7,640,008 B2 | 12/2009 | Gallagher et al. |
| 2001/0029186 A1 | 10/2001 | Canyon et al. |
| 2001/0031645 A1 | 10/2001 | Jarrett |
| 2001/0046214 A1 | 11/2001 | Kang |
| 2001/0046860 A1 | 11/2001 | Lee |
| 2001/0049790 A1 | 12/2001 | Faccin et al. |
| 2002/0045459 A1 | 4/2002 | Morikawa |
| 2002/0051431 A1 | 5/2002 | Choi et al. |
| 2002/0059516 A1 | 5/2002 | Trtiainen |
| 2002/0066036 A1 | 5/2002 | Makineni |
| 2002/0082015 A1 | 6/2002 | Wu |
| 2002/0775844 | 6/2002 | Hagen |
| 2002/0085516 A1 | 7/2002 | Bridgelall |
| 2002/0102974 A1 | 8/2002 | Raith |
| 2002/0118674 A1 | 8/2002 | Faccin et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0155829 A1 | 10/2002 | Proctor, Jr. et al. |
| 2002/0160811 A1 | 10/2002 | Jannette et al. |
| 2002/0164984 A1 | 11/2002 | Thakker |
| 2002/0166068 A1 | 11/2002 | Kilgore |
| 2002/0187780 A1 * | 12/2002 | Souissi ...................... 455/426 |
| 2002/0191575 A1 | 12/2002 | Kalavade et al. |
| 2002/0191595 A1 | 12/2002 | Mar et al. |
| 2002/0196840 A1 | 12/2002 | Anderson et al. |
| 2002/0197984 A1 | 12/2002 | Monin et al. |

| | | |
|---|---|---|
| 2003/0007475 A1 | 1/2003 | Tsuda et al. |
| 2003/0031151 A1 | 2/2003 | Sharma |
| 2003/0043773 A1 | 3/2003 | Chang |
| 2003/0087653 A1 | 5/2003 | Leung |
| 2003/0101356 A1 | 5/2003 | Miettinen et al. |
| 2003/0112789 A1 | 6/2003 | Heinonen |
| 2003/0119480 A1 | 6/2003 | Mohammed |
| 2003/0119489 A1 | 6/2003 | Mohammed |
| 2003/0119490 A1 | 6/2003 | Mohammed |
| 2003/0119527 A1 | 6/2003 | Labun et al. |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil |
| 2003/0172264 A1 | 9/2003 | Dillon |
| 2003/0176181 A1 | 9/2003 | Boesjes |
| 2003/0176186 A1 | 9/2003 | Mohammed |
| 2003/0193952 A1 | 10/2003 | O'Meill |
| 2003/0202486 A1 | 10/2003 | Anton, Jr. et al. |
| 2003/0210199 A1 | 11/2003 | Sward et al. |
| 2003/0219022 A1 | 11/2003 | Dillon |
| 2003/0219024 A1 | 11/2003 | Purnadi et al. |
| 2003/0226017 A1 | 12/2003 | Palekar |
| 2004/0008649 A1 | 1/2004 | Wybenga |
| 2004/0009749 A1 | 1/2004 | Arazi et al. |
| 2004/0010620 A1 | 1/2004 | Solo |
| 2004/0013099 A1 | 1/2004 | O'Neill |
| 2004/0025018 A1 | 2/2004 | Haas |
| 2004/0037312 A1 | 2/2004 | Spear |
| 2004/0053623 A1 | 3/2004 | Hoff et al. |
| 2004/0068571 A1 | 4/2004 | Ahmavaara |
| 2004/0068653 A1 | 4/2004 | Fascenda |
| 2004/0077335 A1 | 4/2004 | Lee et al. |
| 2004/0077346 A1 | 4/2004 | Krenik et al. |
| 2004/0077354 A1 | 4/2004 | Jason |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0116120 A1* | 6/2004 | Gallagher et al. ............ 455/436 |
| 2004/0147223 A1 | 7/2004 | Cho |
| 2004/0162105 A1 | 8/2004 | Reddy et al. |
| 2004/0171378 A1 | 9/2004 | Rautila |
| 2004/0192211 A1* | 9/2004 | Gallagher et al. ......... 455/67.11 |
| 2004/0202132 A1 | 10/2004 | Heinonen |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2004/0218563 A1* | 11/2004 | Porter et al. .................. 370/329 |
| 2004/0219948 A1 | 11/2004 | Jones et al. |
| 2004/0240525 A1 | 12/2004 | Karabinis et al. |
| 2004/0259541 A1 | 12/2004 | Hicks et al. |
| 2004/0264410 A1 | 12/2004 | Sagi et al. |
| 2005/0026650 A1 | 2/2005 | Russel |
| 2005/0064896 A1 | 3/2005 | Rautiola et al. |
| 2005/0070283 A1 | 3/2005 | Hashimoto et al. |
| 2005/0101245 A1 | 5/2005 | Ahmavaara |
| 2005/0101329 A1* | 5/2005 | Gallagher .................... 455/436 |
| 2005/0130654 A1 | 6/2005 | Di Claudio et al. |
| 2005/0130659 A1 | 6/2005 | Grech et al. |
| 2005/0181805 A1 | 8/2005 | Gallagher |
| 2005/0184145 A1* | 8/2005 | Law et al. .................... 235/380 |
| 2005/0186948 A1* | 8/2005 | Gallagher et al. ......... 455/414.1 |
| 2005/0198199 A1 | 9/2005 | Dowling |
| 2005/0207395 A1 | 9/2005 | Mohammed |
| 2005/0255879 A1 | 11/2005 | Shi |
| 2005/0265279 A1* | 12/2005 | Markovic et al. ............. 370/328 |
| 2005/0266853 A1 | 12/2005 | Gallagher |
| 2005/0271008 A1 | 12/2005 | Gallagher |
| 2005/0272424 A1 | 12/2005 | Gallagher |
| 2005/0272449 A1 | 12/2005 | Gallagher |
| 2006/0009201 A1 | 1/2006 | Gallagher |
| 2006/0009202 A1 | 1/2006 | Gallagher |
| 2006/0019656 A1 | 1/2006 | Gallagher |
| 2006/0019657 A1 | 1/2006 | Gallagher |
| 2006/0019658 A1 | 1/2006 | Gallagher |
| 2006/0025143 A1 | 2/2006 | Gallagher |
| 2006/0025144 A1 | 2/2006 | Gallagher |
| 2006/0025145 A1 | 2/2006 | Gallagher |
| 2006/0025146 A1 | 2/2006 | Gallagher |
| 2006/0025147 A1 | 2/2006 | Gallagher |
| 2006/0079258 A1 | 4/2006 | Gallagher |
| 2006/0079259 A1 | 4/2006 | Gallagher |
| 2006/0079273 A1 | 4/2006 | Gallagher |
| 2006/0079274 A1 | 4/2006 | Gallagher |
| 2006/0094431 A1 | 5/2006 | Saifullah et al. |
| 2006/0098598 A1 | 5/2006 | Gallagher |
| 2006/0099935 A1* | 5/2006 | Gallagher et al. ......... 455/414.1 |
| 2006/0114871 A1 | 6/2006 | Buckley et al. |
| 2006/0153110 A1* | 7/2006 | Morgan et al. ................ 370/310 |
| 2006/0291455 A1 | 12/2006 | Katz et al. |
| 2007/0183427 A1 | 8/2007 | Nylander et al. |
| 2007/0238448 A1 | 10/2007 | Gallagher et al. |
| 2008/0076420 A1 | 3/2008 | Khetawat et al. |
| 2008/0101301 A1 | 5/2008 | Thomas et al. |
| 2008/0108319 A1 | 5/2008 | Gallagher |
| 2008/0130564 A1 | 6/2008 | Gallagher et al. |
| 2008/0132239 A1 | 6/2008 | Khetawat et al. |
| 2008/0207170 A1 | 8/2008 | Khetawat et al. |
| 2009/0054070 A1 | 2/2009 | Gallagher et al. |
| 2009/0149195 A1 | 6/2009 | Zhu |
| 2010/0041387 A1 | 2/2010 | Khetawat et al. |
| 2010/0041402 A1 | 2/2010 | Gallagher et al. |
| 2010/0041403 A1 | 2/2010 | Khetawat et al. |

FOREIGN PATENT DOCUMENTS

| | | |
|---|---|---|
| EP | 0936777 | 8/1999 |
| EP | 1207708 | 5/2002 |
| EP | 1207708 B1 | 10/2004 |
| EP | 2115946 | 11/2009 |
| GB | 2282735 | 4/1995 |
| WO | WO-9204796 | 3/1992 |
| WO | WO-9724004 | 7/1997 |
| WO | WO-9948312 | 9/1999 |
| WO | WO-9948315 | 9/1999 |
| WO | WO-0028762 | 5/2000 |
| WO | WO-0051387 | 8/2000 |
| WO | WO 02/45456 A1 | 6/2002 |
| WO | WO-03039009 | 5/2003 |
| WO | WO 03039009 A3 | 5/2003 |
| WO | WO-03092312 | 11/2003 |
| WO | WO-2004002051 | 12/2003 |
| WO | WO-2004034219 | 4/2004 |
| WO | WO-2004036779 | 4/2004 |
| WO | WO-2004039111 | 5/2004 |
| WO | WO-2005006597 | 1/2005 |
| WO | WO 2005/060292 | 6/2005 |
| WO | WO 2005107297 A1 | 10/2005 |
| WO | WO 2005107169 A1 | 11/2005 |
| WO | PCT/US2005/040689 | 3/2006 |
| WO | WO 2005114918 A3 | 3/2006 |
| WO | WO 2007/015071 | 2/2007 |
| WO | WO 2008/106360 | 9/2008 |
| WO | WO 2010/019970 | 2/2010 |
| WO | PCT/US2010/026883 | 3/2010 |
| WO | WO 2010/104992 | 9/2010 |

OTHER PUBLICATIONS

U.S. Appl. No. 10/115,767 (Non-Final Office Action mailed: Dec. 22, 2005), filed Apr. 2, 2002, Jahangir Mohammed, Non-Final Office Action of a related pending U.S. Patent Application.

U.S. Appl. No. 10/115, 835 (Non-Final Office Action mailed: Jul. 25, 2005), filed Apr. 2, 2002, Jahangir Mohammed, Non-Final Office Action of a related pending U.S. Patent Application.

U.S. Appl. No. 10/116,186 (Final Office Action), filed Apr. 2, 2002, Jahangir Mohammed, Final Office Action of a related pending U.S. Patent Application.

U.S. Appl. No. 10/251,901 (Non-Final Office Action mailed: May 5, 2005), filed Sep. 20, 2002, Michael D. Gallagher, Non-Final Office Action of a related pending U.S. Patent Application.

U.S. Appl. No. 10/688,470 (Non-Final Office Action mailed: Dec. 15, 2005), filed Oct. 17, 2003, Michael D. Gallagher, Non-Final Office Action of a related pending U.S. Patent Application.

U.S. Appl. No. 11/004,439 (Non-Final Office Action mailed: Sep. 21, 2005), filed Dec. 3, 2004, Michael D. Gallagher, Non-Final Office Action of a related pending U.S. Patent Application.

"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
U.S. Appl. No. 10/116,023, filed Apr. 2, 2002, Mohammed, Jahangir, Non-Final Office Action of related case mailed: Apr. 13, 2006.
U.S. Appl. No. 11/004,439, filed Dec. 3, 2004, Gallagher, Michael, Non-Final Office Action of related case mailed: Apr. 21, 2006.
U.S. Appl. No. 11/225,398, filed Sep. 12, 2005, Gallagher, Michael, Non-Final Office Action of related case mailed: Apr. 5, 2006.
U.S. Appl. No. 11/225,871, filed Sep. 12, 2005, Gallagher, Michael, Non-Final Office Action of related case mailed: Mar. 30, 2006.
U.S. Appl. No. 11/225,872, filed Sep. 12, 2005, Gallagher, Michael, Non-Final Office Action of related case mailed: May 8, 2006.
U.S. Appl. No. 11/226,610, filed Sep. 13, 2005, Gallagher, Michael, Non-Final Office Action of related case mailed: Mar. 29, 2006.
U.S. Appl. No. 11/226,617, filed Sep. 13, 2005, Gallagher, Michael, Non-Final Office Action of related case mailed: Apr. 4, 2006.
U.S. Appl. No. 11/227,573, filed Sep. 14, 2005, Gallagher, Michael, Non-Final Office Action of related case mailed: Apr. 16, 2006.
U.S. Appl. No. 11/227,784, filed Sep. 14, 2005, Gallagher, Michael, Non-Final Office Action of related case mailed: Mar. 28, 2006.
U.S. Appl. No. 11/227,840, filed Sep. 14, 2005, Gallagher, Micheal, Non-Final Office Action of related case mailed: Apr. 21, 2006.
U.S. Appl. No. 10/251,901, filed Sep. 20, 2002, Gallagher, Michael.
Ericsson, "Ericsson Presents the Mobile@Hometm Concept", *Ericsson Press Releases*, (Mar. 21, 2001),1-2.
Hanson, Claus L., et al., "Mobile@Home—A New Case for Bluetooth in the Access Network", *LM Ericsson, Business Unit Multi Service Networks*, 1-10.
Perkins, Charles E., "Simplified Routing for Mobile Computers Using TCP/IP", *IBM T.J. Watson Research Center*, 0-8186-2625-9/92 IEEE,(1992),7-13.
Wu, Jon C., et al., "Intelligent Handoff for Mobile Wireless Internet", *Mobile Networks and Applications 6*, 2001 Kluwer Academic Publishers, Manufactured in the Netherlands,(2001),67-79.
U.S. Appl. No. 11/107,538, filed Apr. 14, 2005, Mattson, Geoffrey, et al., Non-Published commonly owned U.S. Appl. No. 11/107,538.
Notice of Allowance of U.S. Appl. No. 11/013,833, mailing date Aug. 6, 2009, Gallagher, Michael D., et al., Notice of Allowance of commonly owned U.S. Appl. No. 11/013,833, listed as item #29 in the IDS dated Apr. 14, 2006.
Non-Final Office Action of U.S. Appl. No. 11/013,833, mailing date Feb. 10, 2009, Gallagher, Michael D., et al., Non-Final Office Action of commonly owned U.S. Appl. No. 11/013,833, listed as item #29 in the IDS dated Apr. 14, 2006.
Final Office Action of U.S. Appl. No. 11/013,833, mailing date Oct. 14, 2008, Gallagher, Michael D., et al., Final Office Action of commonly owned U.S. Appl. No. 11/013,833, listed as item #29 in the IDS dated Apr. 14, 2006.
Non-Final Office Action of U.S. Appl. No. 11/013,833, mailing date Jan. 24, 2008, Gallagher, Michael D., et al., Non-Final Office Action of commonly owned U.S. Appl. No. 11/013,833, listed as item #29 in the IDS dated Apr. 14, 2006.
Final Office Action of U.S. Appl. No. 11/013,833, Mar. 6, 2007 mailing date, Gallagher, Michael D., et al., Final Office Action of commonly owned U.S. Appl. No. 11/013,833, listed as item #29 in the IDS dated Apr. 14, 2006.
Notice of Allowance of U.S. Appl. No. 11/096,800, mailing date Dec. 20, 2007, Gallagher, Michael, Notice of Allowance of commonly owned U.S. Appl. No. 11/096,800, now issued U.S. Patent 7,369,859, listed as item #15 above.
Final Office Action of U.S. Appl. No. 11/096,800, mailing date Aug. 21, 2007, Gallagher, Michael, Final Office Action of commonly owned U.S. Appl. No. 11/096,800, now issued U.S. Patent 7,369,859, listed as item #15 above.
Non-Final Office Action of U.S. Appl. No. 11/096,800, mailing date Feb. 23, 2007, Gallagher, Michael, Non-Final Office Action of commonly owned U.S. Appl. No. 11/096,800, now issued U.S. Patent 7,369,859, listed as item #15 above.
Non-Final Office Action of U.S. Appl. No. 11/096,800, mailing date Aug. 24, 2006, Gallagher, Michael, Non-Final Office Action of commonly owned U.S. Appl. No. 11/096,800, now issued U.S. Patent 7,369,859, listed as item #15 above.
International Search Report and Written Opinion for PCT/US2008/054623, mailing date Aug. 18, 2008, Kineto Wireless, Inc. International Search Report and Written Opinion of commonly owned International Patent Application PCT/US2008/54623, listed as item #30 above.
International Search Report and Written Opinion for PCT/US2004/042456, mailing date Jun. 20, 2006, Kineto Wireless, Inc. International Search Report and Written Opinion of commonly owned International Patent Application PCT/US2004/042456, Listed as item #32 above.
International Search Report and Written Opinion for PCT/US2005/013807, mailing date Jul. 6, 2005, Kineto Wireless, Inc., International Search Report and Written Opinion of commonly owned International Patent Application PCT/US2005/013807, which claims priority to U.S. Appl. No. 11/097,866, listed as item #8 in the IDS dated Jun. 14, 2006 and U.S. Appl. No. 11/013,883, listed as item #29 in the IDS dated Apr. 14, 2006.
International Preliminary Report on Patentability and Written Opinion for PCT/US2005/013807, mailing date Nov. 2, 2006, Kineto Wireless, Inc., International Preliminary Report on Patentability and Written Opinion of commonly owned International Patent Application PCT/US2005/013807.
"Unlicensed Mobile Access (UMA); User Perspective (Stage 1);" UMA User Perspective (Stage 1) R1.0.0 Technical Specification, Sep. 1, 2004, 29 pages.
"Unlicensed Mobile Access (UMA); Architecture (Stage 2);" UMA Architecture (Stage 2) R1.0.0 Technical Specification, Sep. 1, 2004, 78 pages.
"Unlicensed Mobile Access (UMA); Protocols (Stage 3);" UMA Protocols (Stage 3) R1.0.0 (Technical Specification, Sep. 1, 2004, 142 pages.
"Unlicensed Mobile Access (UMA); Architecture (Stage 2);" UMA Architecture (Stage 2) R1.0.1 Technical Specification, Oct. 8, 2004, 80 pages.
"Unlicensed Mobile Access (UMA); Protocols (Stage 3);" UMA Protocols (Stage 3) R1.0.1 Technical Specification, Oct. 8, 2004, 142 pages.
"Unlicensed Mobile Access (UMA); Architecture (Stage 2);" UMA Architecture (Stage 2) R1.0.2 Technical Specification, Nov. 3, 2004, 79 pages.
"Unlicensed Mobile Access (UMA); Protocols (Stage 3);" UMA Protocols (Stage 3) R1.0.2 Technical Specification, Nov. 5, 2004, 142 pages.
*Digital Enhanced Cordless Telecommunications(DECT); Global System for Mobile Communications(GSM) DECT/GSM Interworking Profile(IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001.
*Digital Enhanced Cordless Telecommunications(DECT); Global System for Mobile Communications(GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999.
*Digital Enhanced Cordless Telecommunications(DECT); DECT/UMTS Interworking Profile(IWP); Part 1: General Description and Overview*: ETSI TS 101 863-1 V1.1.2, Technical Specification, European Telecommunications Standards Institute, Sophia Antipolis, FR, Nov. 2001.
*Radio Equipment and Systems(RES); Digital Enhanced Cordless Telecommunications/Global System for Mobile Com-*

*munications(DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996.

Updated portions of prosecution history of U.S. Appl. No. 11/013,883, filed Nov. 20, 2009, Gallagher, Michael, et al., Updated portions of prosecution history of commonly owned U.S. Appl. No. 11/013,883, listed as item #16 in the IDS filed Aug. 3, 2010, including action dated Nov. 20, 2009 (2 pages).

Updated portions of prosecution history of U.S. Appl. No. 11/697,710, filed Sep. 10, 2010, Gallagher, Michael, et al., Updated portions of prosecution history of commonly owned U.S. Appl. No. 11/697,710, listed as item #16 in the IDS filed Aug. 26, 2009, including action dated Sep. 10, 2010 (4 pages).

Portions of prosecution history of U.S. Appl. No. 12/027,255, filed Oct. 6, 2010, Khetawat, Amit, et al., Portions of prosecution history of commonly owned U.S. Appl. No. 12/027,255, listed as item #18 in the IDS filed Aug. 26, 2009, including action dated Oct. 6, 2010 (21 pages).

Updated portions of prosecution history of U.S. Appl. No. 11/929,630, filed Sep. 17, 2010, Gallagher, Michael, et al., Updated portions of prosecution history of commonly owned U.S. Appl. No. 11/929,630, listed as item #17 in the IDS filed Aug. 26, 2009, including responses/amendments dated Sep. 16, 2010 and Sep. 17, 2010 (26 pages).

Portions of prosecution history of U.S. Appl. No. 12/197,143, filed Oct. 1, 2010, Gallagher, Michael, et al., Portions of prosecution history of commonly owned U.S. Appl. No. 12/197,143, listed as item #19 in the IDS filed Aug. 26, 2009, including action dated Jul. 1, 2010; and response/amendment dated Oct. 1, 2010 (21 pages).

Updated portions of prosecution history of U.S. Appl. No. 11/013,883, filed Nov. 6, 2009, Gallagher, Michael, et al., Updated portions of prosecution history of commonly owned U.S. Appl. No. 11/013,883, listed as item #16 above, including office actions dated Aug. 24, 2006, and Jul. 6, 2007; and responses/amendments dated Nov. 24, 2006, May 7, 2007, Aug. 5, 2007, Jan. 15, 2008, May 27, 2008, Aug. 28, 2008, Oct. 3, 2008, Jan. 14, 2009, Jun. 10, 2009, and Nov. 6, 2009 (178 pages).

Updated portions of prosecution history of U.S. Appl. No. 11/096,800, filed Oct. 22, 2007, Gallagher, Michael, et al., Updated portions of prosecution history of commonly owned U.S. Appl. No. 11/096,800, listed as item #15 in the IDS filed Aug. 26, 2009, including responses/amendments dated Nov. 24, 2006, May 23, 2007, and Oct. 22, 2007 (40 pages).

Portions of prosecution history of U.S. Appl. No. 11/697,710, filed Jun. 28, 2010, Gallagher, Michael, et al., Portions of prosecution history of commonly owned U.S. Appl. No. 11/697,710, listed as item #16 in the IDS filed Aug. 26, 2009, including office action dated Jan. 27, 2010; and response/amendment dated Jun. 28, 2010 (46 pages).

Non-Final office action of U.S. Appl. No. 11/929,630, filed Jun. 16, 2010, Gallagher, Michael, et al., Non-Final office action of commonly owned U.S. Appl. No. 11/929,630, listed as item #17 in the IDS filed Aug. 26, 2009.

International Preliminary Report on Patentability for PCT/US2004/042456, Jun. 20, 2006 (issuance date), Kineto Wireless, Inc., International Preliminary Report on Patentability of commonly owned International Patent Application PCT/US2004/042456, listed as item #32 in the IDS filed Aug. 26, 2009. This reference is submitted to replace item #33 in the above mentioned IDS to correct a typographical error in title of the report.

International Preliminary Report on Patentability for PCT/US2008/054623, Aug. 26, 2009 (issuance date), Kineto Wireless, Inc., International Preliminary Report on Patentability of commonly owned International Patent Application PCT/US2008/054623, listed as item #30 in the IDS filed Aug. 26, 2009.

European Search Report and Written Opinion for EP08730429, Apr. 16, 2010 (issuance date), Kineto Wireless, Inc., European Search Report and Written Opinion of commonly owned European patent application EP08730429, listed as item #31 above.

International Search Report and Written Opinion for PCT/US2009/054098, Oct. 28, 2009 (mailing date), Kineto Wireless, Inc., International Search Report and Written Opinion of commonly owned International Patent Application PCT/US2009/054098, listed as item #33 above.

International Search Report and Written Opinion for PCT/US2010/026883, May 4, 2010 (mailing date), Kineto Wireless, Inc., International Search Report and Written Opinion of commonly owned International Patent Application PCT/US2010/026883, listed as item #35 above.

U.S. Appl. No. 11/225,870, filed Sep. 12, 2005, Gallagher, Michael, Non-Final Office Action of related case mailed: May 30, 2006.

U.S. Appl. No. 11/227,842, filed Sep. 14, 2005, Gallagher, Michael, Non-Final Office Action of related case mailed: Jun. 5, 2006.

U.S. Appl. No. 11/228,853, filed Sep. 15, 2005, Gallagher, Michael, Non-Final Office Action of related case mailed: Jun. 6, 2006.

U.S. Appl. No. 11/229,470, filed Sep. 15, 2005, Gallagher, Michael, Non-Final Office Action of related case mailed: Jun. 5, 2006.

U.S. Appl. No. 11/097,866, filed Mar. 31, 2005, Michael D. Gallagher et al., Non-published patent application (specification, drawings, claims, abstract) of a related pending U.S. Patent Application.

U.S. Appl. No. 11/110,222, filed Apr. 20, 2005, Michael D. Gallagher et al., Non-published patent application (specification, drawings, claims, abstract) and Preliminary Amendent of a related pending U.S. Patent Application.

* cited by examiner

METHODS AND APPARATUSES FOR EFFECTING HANDOVER IN INTEGRATED WIRELESS SYSTEMS

FIELD

Embodiments of the invention relate generally to the field of wireless telecommunications, and more specifically to wireless telecommunications through a system integrating a licensed wireless system and an unlicensed wireless system.

BACKGROUND

Systems exist that integrate licensed wireless systems (LWSs) and unlicensed wireless systems (UWSs) and provide seamless transition between the two.

An LWS refers to public cellular telephone systems and/or Personal Communication Services (PCS) telephone systems, for example, providing service over a licensed spectrum. Such licenses are expensive as is the equipment used to support communications these licensed frequencies, and this expense is passed on to the user.

A UWS, on the other hand, may comprise, for example, a base station with a physical connection to a landline providing service to a handset using an unlicensed, free spectrum (e.g., approximately 2.4 GHz or 5 GHz). Thus, the user of a licensed wireless system pays relatively high fees for relatively low quality service. Systems that integrate an LWS and a UWS allow service to be provided through the UWS, when a user is within an unlicensed wireless service coverage area. The user receives the benefit of the relatively inexpensive, high quality communication service. If the user moves outside of the unlicensed wireless service coverage area, the same communication session can be maintained without interruption by transitioning to the LWS.

FIG. 1 illustrates a system that integrates an LWS and a UWS in accordance with the prior art. System 100, shown in FIG. 1, includes an LWS 110 and a UWS system 150. The LWS 110 typically includes a number of mobile switching centers (MSCs) 112a-112c. Each MSC 112 typically serves multiple base station controllers (BSCs) 114a-114c, each of which, in turn, serves multiple base station transceiver systems (BTSs) 116a-116c. The LWS 110 provides mobile wireless communications to individuals using wireless transceivers, shown for example as user terminal (UT) 118. Wireless transceivers (UTs) include cellular telephones, PCS telephones, wireless-enabled personal digital assistants, wireless modems, and the like. A typical UT may include a display, keypad, and a control circuit. The display may provide a visual indication to a user when the UT is within the service range of the LWS or the UWS, the keypad is used in a conventional manner, and the control circuit may be in the form of a processor, a hardwired circuit, a programmable logic device, an application specific integrated circuit, and the like.

As shown in FIG. 1, UWS 150 is connected to the LWS 110 through an unlicensed network controller (UNC) 154 (also referred to as an IP network controller (INC). The UNC 154 is connected to an MSC (e.g., MSC 112c) of the LWS 110. Instead of one or more BSCs, MSC 112c has the UNC 154 connected to it. The UNC 154 is connected through internet 155 to a plurality of internet access points (IAPB) 156a-156c.

If UT 118 is within the service coverage area of the IAPB 156a-156c, the communication is routed over the higher quality/lower cost UWS 150. If the UT 118 is not within the service coverage area of the IAPB 156a-156c, the communication is routed over the lower quality/higher cost LWS 110.

The system 100 can handover a communication between the LWS and the UWS. That is, while a communication is in progress the communication can be handed over from routing on the LWS to routing on the UWS or vice versa. For example, a user may initiate a communication while moving from one location to another location, and this communication may be routed over the LWS. After arriving at a desired destination, the user may be within the service coverage area of an IAP. The communication is then handed over from routing on the LWS to routing on the UWS so that the user can take advantage of the higher quality/lower cost of the UWS.

Conventional LWSs can provide location-based services because each BTS of the system provides service coverage for a corresponding geographic location. Moreover, each BTS has a unique identification. For example, in a Global System for Mobile Communications (GSM) system, each cell has a unique cell identifier, known as a cell global identifier (CGI). The CGI is comprised of a mobile country code, a mobile network code, a location area code, and a cell ID. In addition there is an absolute radio frequency control mobile (ARFCM) and a base station identity code (BSIC). When a user initiates a communication, the system can determine the general geographic location of the user and can provide location-based services to the user. Such services may include the location of proximate businesses or services of interest to the user, or providing the user's location to emergency services (e.g., medical or automotive assistance).

To maintain the ability to provide such services, the system must be able to effect and monitor a handover from one cell (the area covered by a particular BTS) to another. Typically, to effect handover, information has to be communicated between different nodes within the system. Each MSC and each BSC of a typical LWS has implemented therein, a configuration database containing information about the other elements within the system that the MSC of BSC requires to effect handover. For example, each particular MSC must store the CGIs for all of the cells for which it provides service, as well as the CGIs for each cell for which service is provided by a neighboring MSC (i.e., an MSC which may handover a communication to the particular MSC).

For a typical LWS, this amount of data is manageable because the BTSs are static and are added to the system incrementally. This is not the case with the UWS portion of an integrated system. For the UWS, instead of one BTS providing access to the network for multiple (e.g., hundreds) of UTs, each UT accesses the network through a distinct IAP. Determining and storing identification information for such a large number of access points would be time-consuming and resource intensive. Therefore, the integrated LWS/UWS system in accordance with the prior art, assigns a single cell identifier to the UNC/INC and all of the access points (e.g., IAPs) of the UWS portion of the integrated system. This cell identifier is referred to as the UNC global CGI. In a sense, the entire UWS portion of the integrated system is viewed as a single cell of the network for identification purposes. The single cell identifier associated with the UWS is stored in all of the MSCs of the system. Therefore, communications initiated on the LWS can be handed over to the UWS using the same cell identifier.

This scheme, reduces the time and resources required to store identification information for multiple access points of the UWS on many different MSCs, however, the scheme does not allow for providing location-based services to users on the UWS. To address that issue, each IAP may be assigned a CGI based on geographic location (e.g., longitude and latitude) or some other criteria. The only MSC to store all of the CGI information of the IAPB of the UWS is an interface MSC that connects the LWS to the UWS (e.g., MSC 112c of system 100).

One disadvantage of such a scheme is in the context of a handed out communication (i.e., handed out from the UWS to the LWS). The disadvantage is that a handover request message from the source MSC (i.e., interface MSC) for a particular CGI will be rejected by the destination MSC of the LWS. This rejection is due to the fact that the destination MSC will not recognize the CGI of any given IAP of the UWS because the CGI information is not stored on the destination MSC.

Another disadvantage of the prior art scheme described is in the context of a handed in communication (i.e., handed in from an LWS to a UWS). The disadvantage here is that the destination MSC (i.e., the interface MSC) cannot determine to which particular IAP the communication being handed over from the source MSC of the LWS pertains. Thus, for a handed in communication, location-based services cannot be provided.

SUMMARY

Embodiments of the invention provide methods and apparatuses for effecting a handover between the licensed and unlicensed portions of an integrated wireless network. For one embodiment, an integrated wireless system is implemented, the integrated wireless system including a licensed system and an unlicensed system. A cell identifier associated with a user terminal is changed in conjunction with a handover process between the licensed system and the unlicensed system.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Embodiments of the invention provide methods and apparatuses for effecting handover within a wireless telecommunications system integrating a licensed wireless system and an unlicensed wireless system. One embodiment of the invention effects a hand out from a IAP of an UWS to an MSC of a LWS by indicating to the source MSC (i.e., interface MSC) that a handover has been performed from a cell associated with the IAP to a cell associated with the whole UNC. Such an embodiment, allows the source MSC to request a handover using the CGI of the whole UNC, which allows the destination MSC to accept and fulfill the handover request.

One embodiment of the invention effects a hand in from an LWS to an UWS. Once a handover has been completed from the LWS to a cell representing the whole UNC, another handover is indicated from the cell representing the whole UNC to a cell representing the location of the IAP.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Process

Handover from UWS to LWS

Figure 1:
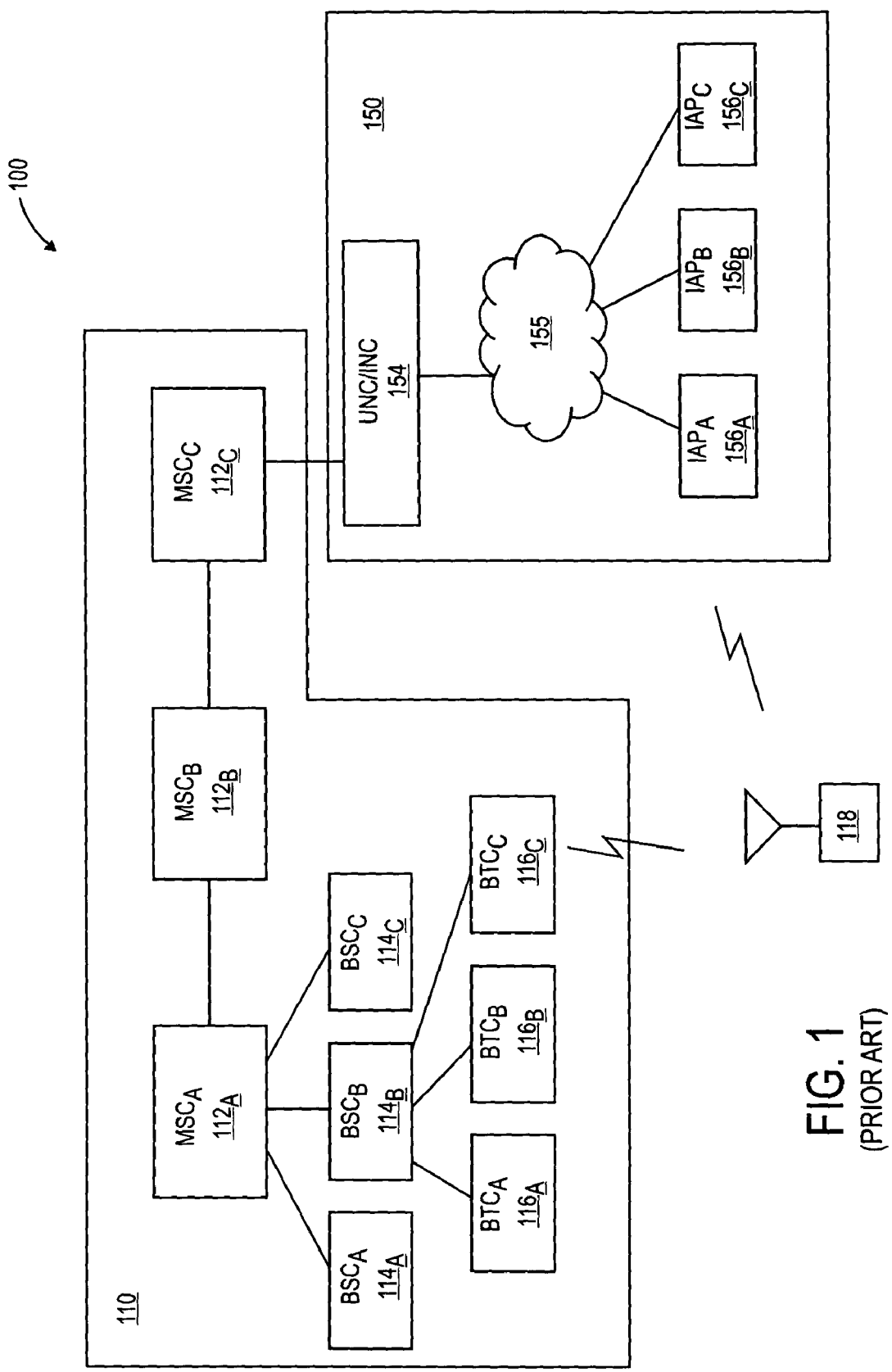
FIG. 1 illustrates a system that integrates an LWS and a UWS in accordance with the prior art.
Figure 2:
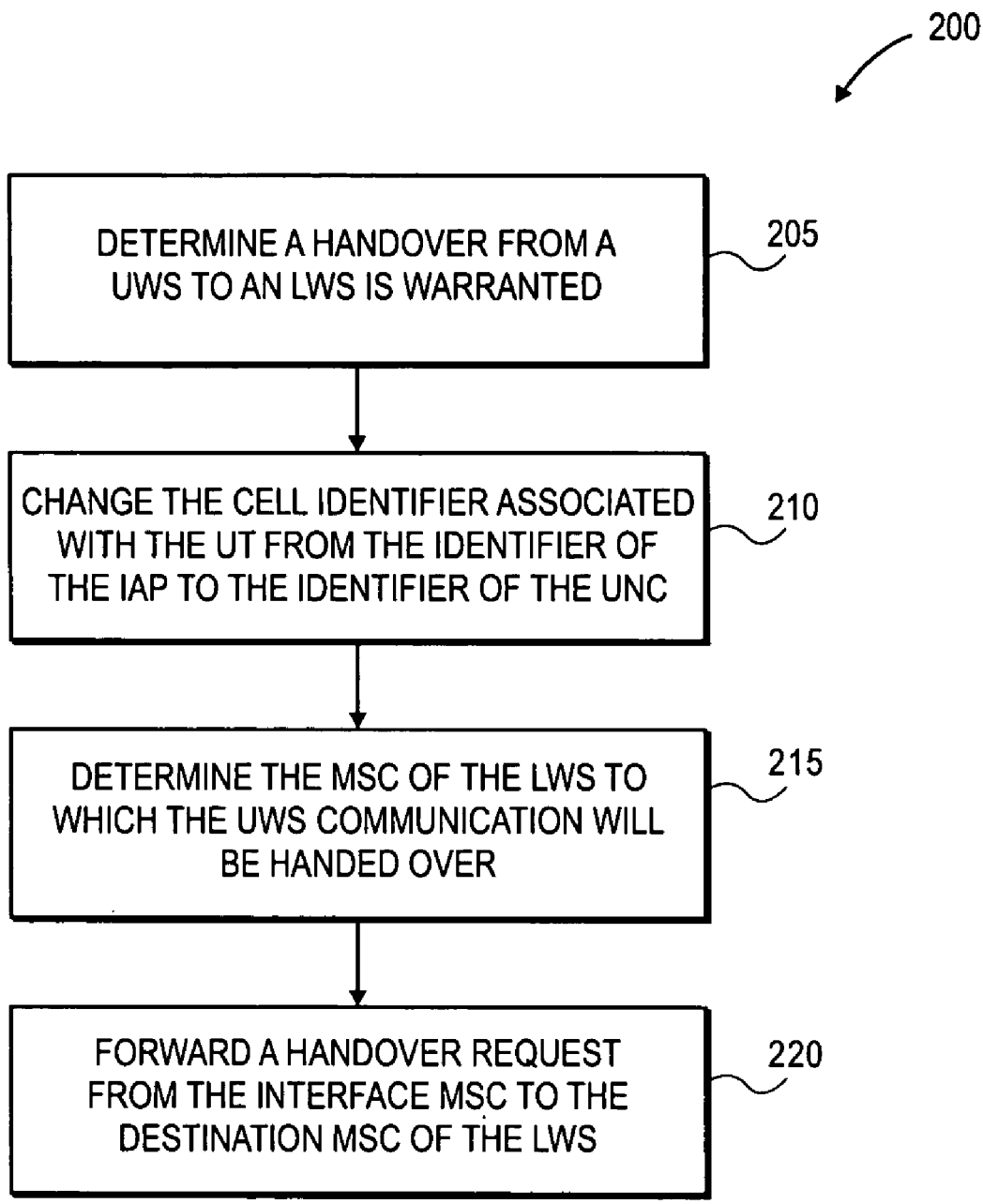
FIG. 2 illustrates a process by which handover is effected from a UWS to a LWS in accordance with one embodiment of the invention.

FIG. 2 illustrates a process by which handover is effected from a UWS to a LWS in accordance with one embodiment of the invention. The process occurs at a point at which a UT has initiated a communication on the UWS at a particular IAP. The communication could be a telephone call, short messaging service (SMS) message, data, etc.

Process 200, shown in FIG. 2, begins at operation 205 in which a determination is made to handover the communication to the LWS.

At operation 210, the cell identifier associated with the UT is changed from the cell identifier corresponding to the IAP to the cell identifier corresponding to the UNC. The UNC functionality may be implemented independently or within a network element (e.g., a BTS, MSC, etc.).

At operation 215, a determination is made as to which MSC of the LWS the communication on the UWS will be handed out to (i.e., the destination MSC is determined). For example, if better service is available from one or more particular cells of the LWS; the MSC serving the optimal cell is determined.

At operation 220, a handover request is forwarded using the cell identifier of the UNC. Because the cell identifier of the UNC is stored on the destination MSC, the destination MSC will accept and fulfill the handover request, thus effecting handover from the UWS to the LWS.

Figure 3:
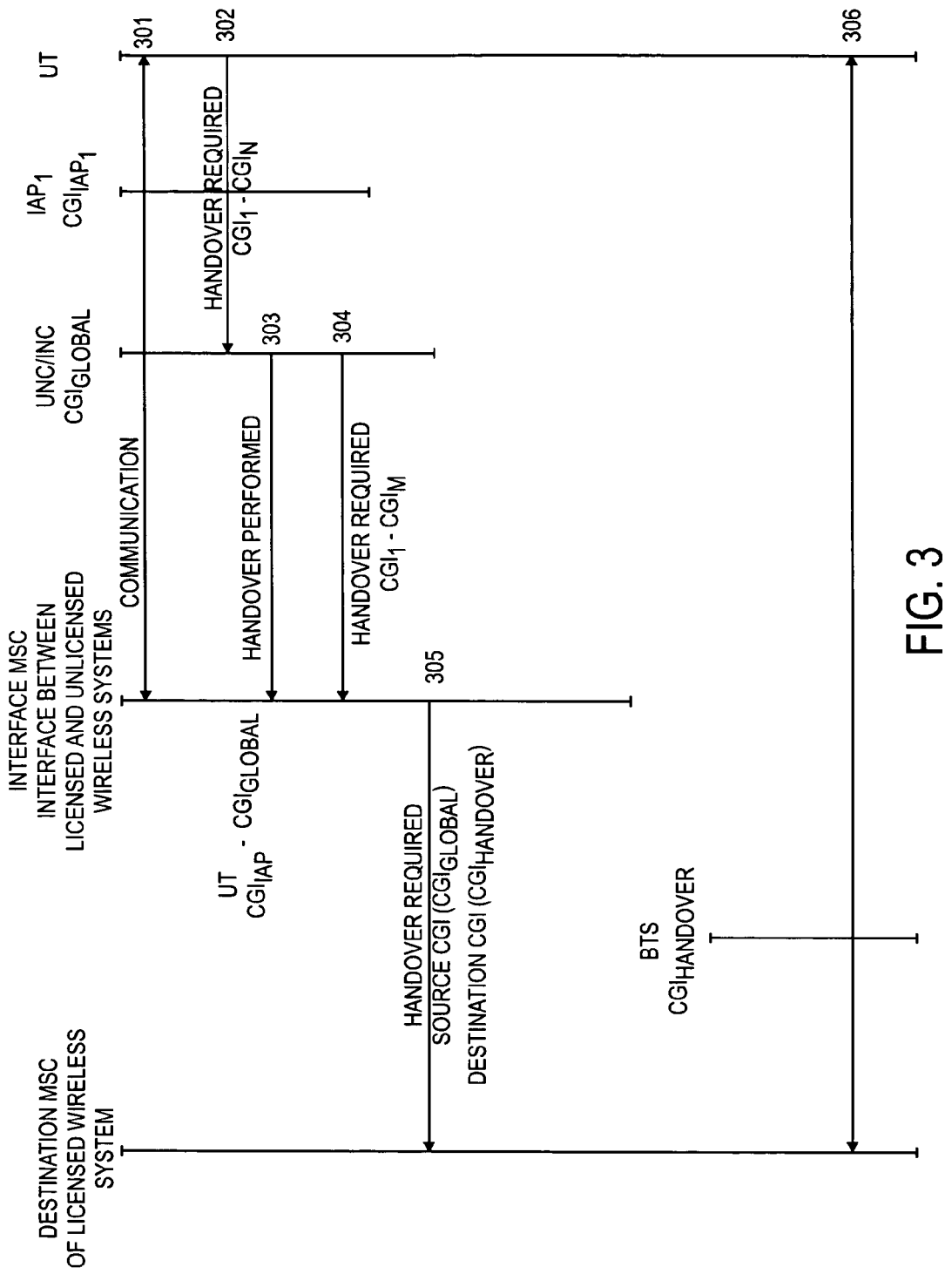
FIG. 3 illustrates the exchange of commands between elements of an integrated wireless system to effect handover from the UWS to the LWS in accordance with one embodiment of the invention.

FIG. 3 illustrates the exchange of commands between elements of an integrated wireless system to effect handover from the UWS to the LWS in accordance with one embodiment of the invention. At 301a communication is on-going on a UWS. The UT accesses the UWS through the IAP (i.e., $IAP_1$) having a corresponding CGI (i.e., $CGI_{IAP1}$). The communication is forwarded from the UT, through the IAP, and the UNC to the interface MSC. The UNC through which this communication passes has a cell identifier corresponding to the UNC area that it covers, the $CGI_{global}$. The interface MSC is aware that the UT is communicating through $IAP_1$ having corresponding CGI, $CGI_{IAP1}$.

At some point in the duration of the communication, the UT determines that the wireless link from the IAP is not providing as high a quality of service as the LWS and determines that a handover is warranted. This could be due, for example to the deterioration of the communication signal on the UWS.

At 302 the UT forwards a handover required message to the UNC. The handover required message includes the CGI associated with the cell providing higher quality service. Higher quality of service may be available from several cells each having a different CGI. Therefore the UT may provide several CGIs (e.g., $CGI_1$-$CGI_n$).

At 303 the UNC forwards a handover performed message to the interface MSC. The handover performed message indicates to the interface MSC that the UT desires to go to a global cell. The interface MSC then moves the UT from $CGI_{IAP1}$ to $CGI_{global}$.

AT 304 the UNC forwards a handover required message to the interface MSC. The handover required message includes the destination CGIs. The UNC may alter the list of several CGIs provided by the UT. For example, the UNC may pare down the list down based on a variety of factors including the traffic present on particular cells. In general, the handover required message forwarded form the UNC to the interface MSC will contain several CGIs, $CGI_1$-$CGI_m$, each pertaining to a corresponding cell of the LWS. The interface MSC determines which of these possible cells to handover the communication to having a corresponding CGI, $CGI_{handover}$.

At 305 the interface MSC forwards a handover required message to the destination MSC (i.e., the MSC serving the determined cell having $CGI_{handover}$). The interface MSC provides the destination CGI, $CGI_{handover}$, and the source CGI (i.e., the CGI corresponding to the UT, $CGI_{global}$. Therefore, the handover required message from the interface MSC to the destination MSC no longer includes the CGI corresponding to the IAP (i.e., $CGI_{IAP1}$), which the destination MSC would reject. Instead, the handover required message from the interface MSC to the destination MSC includes the CGI corresponding to the UNC (i.e., $CGI_{global}$), which the destination MSC is configured to accept. Thus, handover from a UWS to an LWS may be effected.

At 306 the communication is routed on the LWS between the UT through the BTS having corresponding CGI, $CGI_{handover}$, and the destination MSC.

Handover from LWS to UWS

Figure 4:
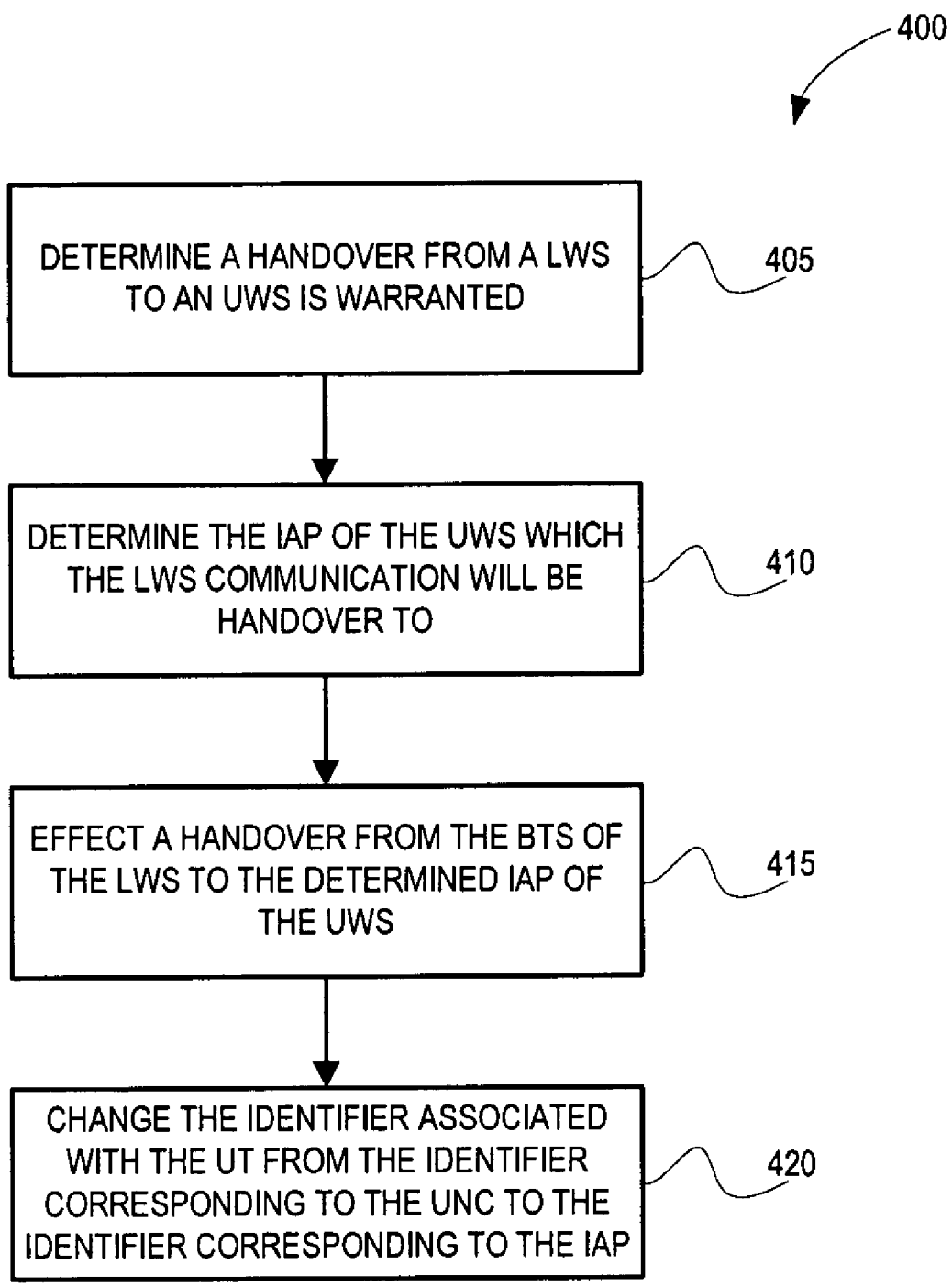
FIG. 4 illustrates a process by which handover is effected from a LWS to a UWS in accordance with one embodiment of the invention.

FIG. 4 illustrates a process by which handover is effected from an LWS to a UWS in accordance with one embodiment of the invention. The process occurs at a point at which a UT has initiated a communication on the LWS at a particular BTS.

Process 400, shown in FIG. 4, begins at operation 405 in which a determination is made to handover the communication to the UWS. This operation is analogous to operation 205 discussed above in reference to process 200, and is effected for analogous reasons and purposes.

At operation 410, the IAP of the UWS to which the LWS communication will be handed over is determined.

At operation 415, a handover is effected from the BTS of the LWS to the determined IAP of the UWS. The handover is effected using the cell identifier of the INC of the UWS.

At operation 420, the cell identifier associated with the UT is changed from the cell identifier corresponding to the UNC to the cell identifier corresponding to the determined IAP.

Figure 5:
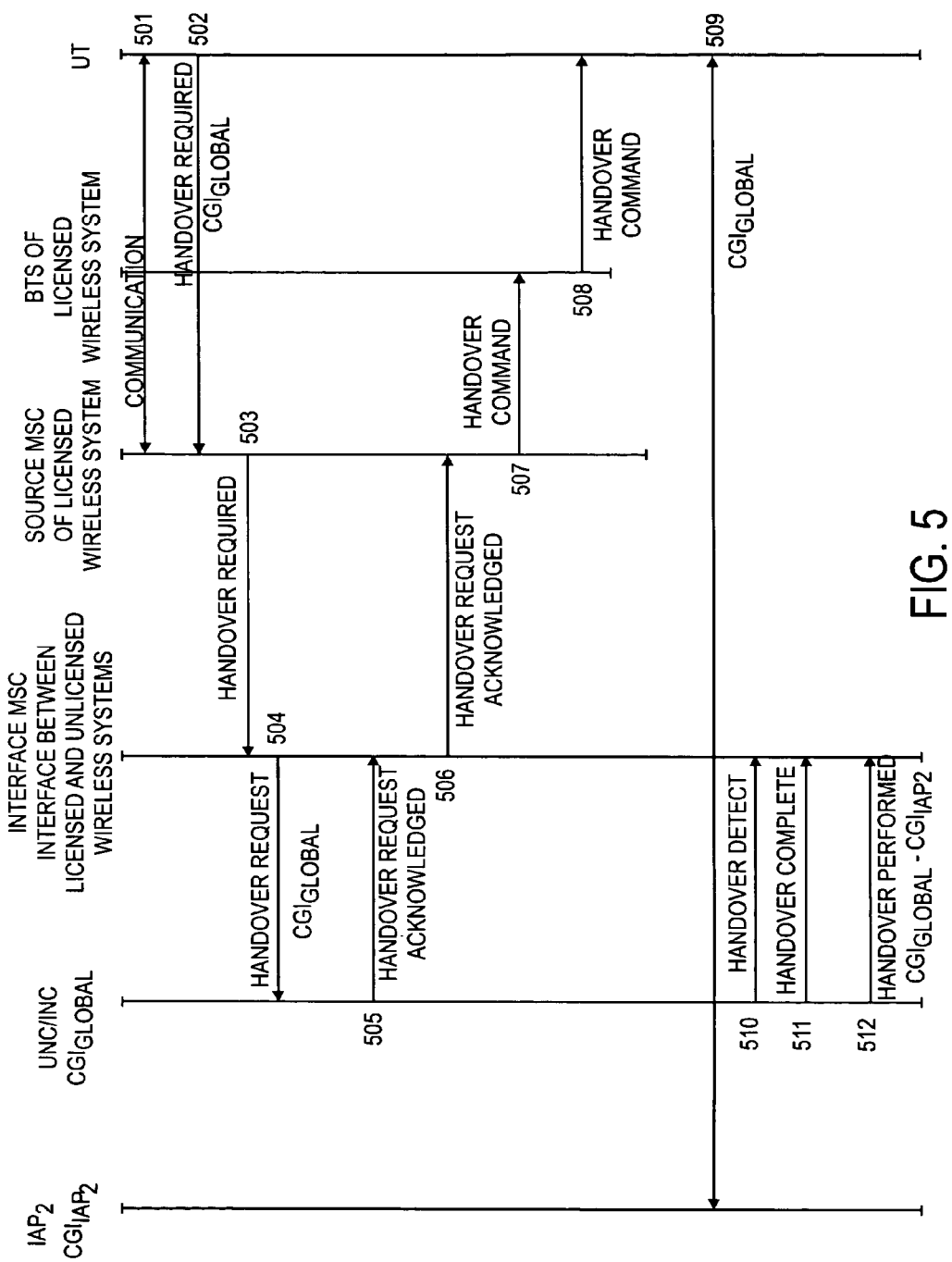
FIG. 5 illustrates the exchange of commands between elements of an integrated wireless system to effect handover from the LWS to the UWS in accordance with one embodiment of the invention.

FIG. 5 illustrates the exchange of commands between elements of an integrated wireless system to effect handover from the LWS to the UWS in accordance with one embodiment of the invention.

At 501a communication is initiated on an LWS. The UT accesses the LWS through a BTS of the LWS being served by an MSC of the LWS (i.e., source MSC). The BTS may be one of several being served by source MSC.

At some point in the duration of the communication, the UT (or BTS) determines that the wireless link from the BTS is not providing as high a quality of service as the UWS and determines that a handover is warranted. This could be due, for example to the deterioration of the communication signal on the LWS or simply the presence of a viable UWS route for the communication, providing lower cost service.

At 502 the UT (or alternatively the BTS) forwards a handover required message to the source MSC. The handover required message includes the CGI corresponding to the UNC of the UWS (i.e., $CGI_{global}$).

At 503 the source MSC of the LWS forwards a handover required message to the interface MSC connected to the UNC of the UWS.

At 504 the interface MSC forwards a handover request message to the INC of the UWS. The handover request message includes the $CGI_{global}$.

At 505 the UNC forwards a handover request acknowledgement message to the interface MSC.

At 506 the interface MSC forwards a handover request acknowledgement message to the source MSC.

At 507 the source MSC forwards a handover command to the BTS of the LWS.

At 508 the BTS forwards a handover command to the UT. The handover command includes the $CGI_{global}$. At this point the UT forms a connection with the UNC.

At 509 the UT establishes service through the UNC and $IAP_2$; the handover is to $CGI_{global}$.

At 510 the UNC forwards a handover detect message to the interface MSC and subsequently forwards a handover complete message to the interface MSC, as well, at 511.

At this point the handover request is associated with the $CGI_{global}$. The interface MSC stores information indicating that the UT is within the cell identified by $CGI_{global}$.

At 512 the UNC forwards a handover performed message to the interface MSC. The handover performed message includes the CGI corresponding to $IAP_2$ (i.e., $CGI_{IAP2}$). The interface MSC now stores $CGI_{IAP2}$. The interface MSC can now determine the location of $IAP_2$, specifically. Thus location-based services can be provided to the UT being serviced through $IAP_2$.

General Matters

Embodiments of the invention provide methods and apparatuses for effecting a handover between the licensed and unlicensed portions of an integrated wireless network. For one embodiment, prior to the hand out of a communication from the UWS, the cell identifier associated with the UT is changed from the cell identifier corresponding to the IAP of the UWS to the cell identifier corresponding to the UNC of the wireless system. This change allows the MSC of the LWS to accept and fulfill a handover request from the UWS. For one such embodiment, this change is effected by forwarding a handover performed message from the UNC to the interface MSC prior to attempting handover of the UT from the UWS to the LWS.

In accordance with an alternative embodiment of the invention, after a hand in of a communication to the UWS, the cell identifier associated with the UT is changed from the cell identifier corresponding to the UNC of the UWS to the cell identifier corresponding to the IAP of the UWS. For one such embodiment, this change is effected by forwarding a handover performed message from the UNC to the interface MSC subsequent to completing handover of the UT from the LWS to the UWS.

Though described for various embodiments in the context of a GSM system, embodiments of the invention are equally applicable to other time division multiple access (TDMA) systems (e.g., iDEN) as well as code division multiple access (CDMA) systems (e.g., cdma2000, cdmaOne, W-CDMA), frequency division multiple access (FDMA) systems, and spatial division multiple access (SDMA) systems, or other comparable systems. CGI is used herein to describe a cell identifier, but could be substituted with any term used for cell identification.

The invention includes various operations. Many of the methods are described in their most basic form, but operations can be added to or deleted from any of the methods without departing from the basic scope of the invention.

The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a digital processing system (DPS) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). The operations may be performed at a UNC, BTS, a BSC, a MSC, or performed by a combination of these control devices.

Figure 6:
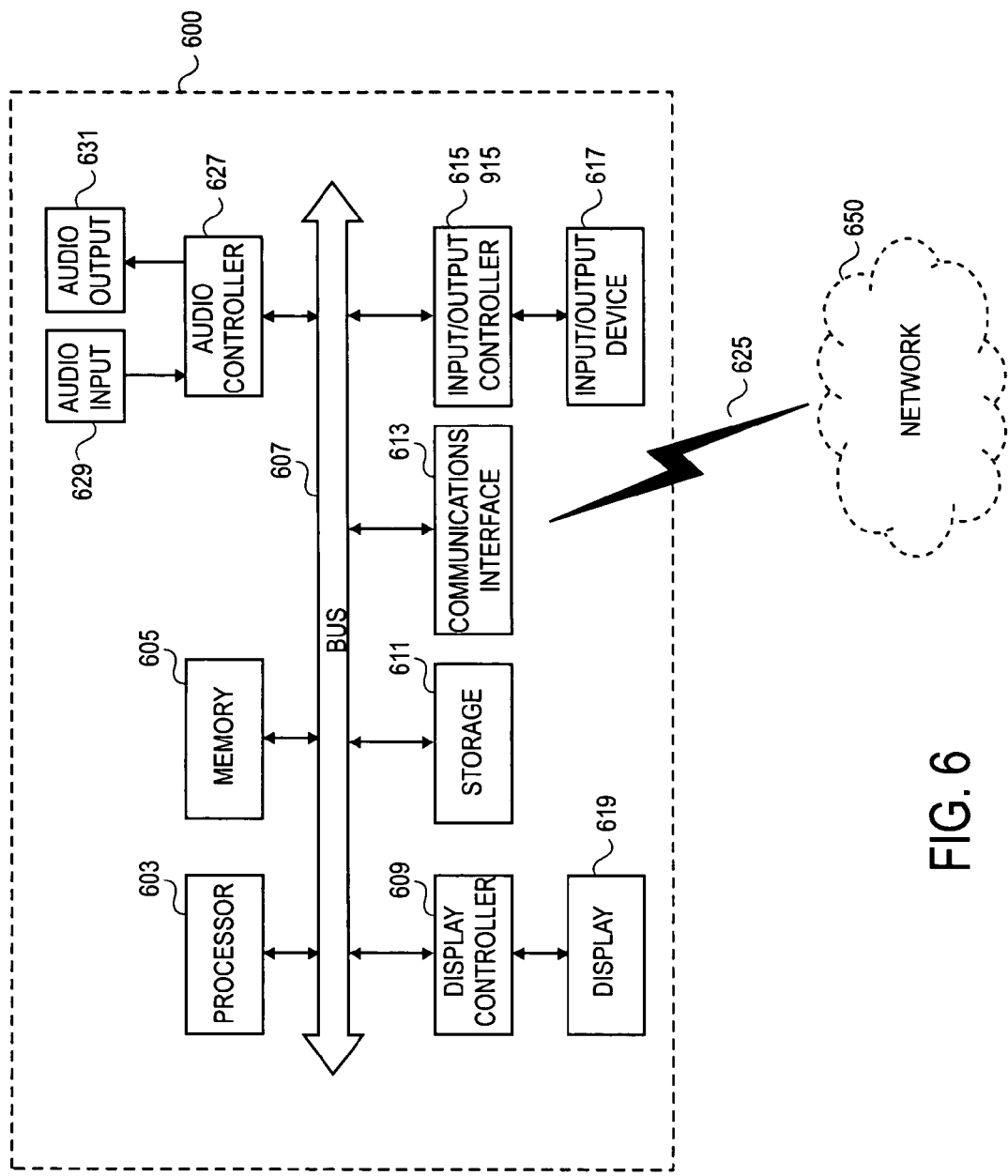
FIG. 6 is a block diagram illustrating one embodiment of a DPS 601 that may be used in accordance with an embodiment of the present invention.

FIG. 6 is a block diagram illustrating one embodiment of a DPS 601 that may be used in accordance with an embodiment of the present invention. For alternative embodiments of the present invention, DPS 601 may be a computer that includes a processor 603 coupled to a bus 607. In one embodiment, memory 605, storage 611, display controller 609, communications interface 613, input/output controller 615 and audio controller 627 are also coupled to bus 607.

DPS 601 interfaces to external systems through communications interface 613. Communications interface 613 may include a radio transceiver compatible with wireless telephone signals or other interfaces for coupling a device to other devices. In one embodiment of the present invention, carrier wave signal 625 is received/transmitted between communications interface 613 and network 650. In one embodiment of the present invention, a communications signal 625 may be used to interface DPS 601 with another computer system, a network hub, router or the like. In one embodiment of the present invention, carrier wave signal 625 is considered to be machine readable media, which may be transmitted through wires, cables, optical fibers or through the atmosphere, or the like.

In one embodiment of the present invention, processor 603 may be a conventional microprocessor, such as for example but not limited to an Intel x86 or Pentium family microprocessor, a Motorola family microprocessor, or the like. Memory 605 may be a machine-readable medium such as dynamic random access memory (DRAM) and may include static random access memory (SRAM). Display controller 609 controls in a conventional manner a display 619, which in one embodiment of the invention may be a cathode ray tube (CRT), a liquid crystal display (LCD), an active matrix display, a television monitor or the like. The input/output device 617 coupled to input/output controller 615 may be a keyboard, disk drive, printer, scanner and other input and output devices (e.g., a mouse). In one embodiment of the present invention, audio controller 627 controls in a conventional manner audio output 631 and audio input 629.

Storage 611 may include machine-readable media such as for example but not limited to a magnetic hard disk, a floppy disk, an optical disk, a smart card or another form of storage for data. In one embodiment of the present invention, storage 611 may include removable media, read-only media, read-able/writable media or the like. Some of the data may be written by a direct memory access process into memory 605 during execution of software in computer system 601. It is appreciated that software may reside in storage 611, memory 605 or may be transmitted or received via modem or communications interface 613. For the purposes of the specification, the term "machine readable medium" shall be taken to include any medium that is capable of storing data, information or encoding a sequence of instructions for execution by processor 603 to cause processor 603 to perform the methodologies of the present invention. The term "machine readable medium" shall be taken to include, but is not limited to solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for effecting a handover in an integrated wireless system comprising an unlicensed first wireless system and a licensed second wireless system, the method comprising:

receiving a handover request to perform the handover for a communication in progress, the handover being from the unlicensed first wireless system to the licensed second wireless system; and prior to effecting the handover, changing a cell identifier associated with a user terminal in conjunction with the handover of the communication in progress, wherein the cell identifier is changed from a cell identifier of a first region of the unlicensed first wireless system to a cell identifier of a second region of the unlicensed first wireless system.

2. The method of claim 1, wherein the cell identifier associated with the user terminal is changed from a cell identifier corresponding to a service region of an access point of the unlicensed first wireless system to a cell identifier corresponding to a service region of an unlicensed network controller of the unlicensed first wireless system.

3. The method of claim 2 further comprising:
sending a message indicating that the handover has been performed from the cell identifier corresponding to the service region of the access point to the cell identifier corresponding to the service region of the unlicensed network controller.

4. The method of claim 1, wherein the licensed second wireless system is one of a time division multiple access system, a code division multiple access system, a frequency division multiple access system, and a spatial division multiple access system.

5. The method of claim 4, wherein the licensed second wireless system is a Global System for Mobile communications system, and the cell identifier associated with the user terminal is changed by forwarding a handover performed message from the unlicensed network controller to a mobile switching center, the mobile switching center providing an interface between the licensed second wireless system and the unlicensed first wireless system.

6. The method of claim 1, wherein the communication in progress is one of an active call, a short message service (SMS) communication, and a data transmission.

7. A method for effecting a handover in an integrated wireless system comprising an unlicensed first wireless system and a licensed second wireless system, the method comprising:
receiving a handover request to perform the handover for a communication in progress, the handover being from the licensed second wireless system to the unlicensed first wireless system; and
subsequent to effecting the handover, changing a cell identifier associated with a user terminal in conjunction with the handover of the communication in progress, wherein the cell identifier is changed from a cell identifier of a first region of the unlicensed first wireless system to a cell identifier of a second region of the unlicensed first wireless system.

8. The method of claim 7, wherein the cell identifier associated with the user terminal is changed from a cell identifier corresponding to a service region of an unlicensed network controller of the unlicensed first wireless system to a cell identifier corresponding to a service region of an access point of the unlicensed first wireless system.

9. The method of claim 8, wherein the cell identifier corresponding to the service region of the access point indicates a geographic location of the access point.

10. The method of claim 9 further comprising:
using the indicated geographic location of the access point to provide location based services to a user of the user terminal.

11. The method of claim 8 further comprising:
sending a message indicating that the handover has been performed from a cell associated with the unlicensed network controller to a cell associated with the access point.

12. The method of claim 11, wherein the licensed second wireless system is a Global System for Mobile communications system, and the message is a handover performed message.

13. A non-transitory computer-readable medium storing a computer program for execution by a processor, the computer program for effecting a handover in an integrated wireless system comprising an unlicensed first wireless system and a licensed second wireless system, the computer program comprising sets of instructions for:
receiving a handover request to perform the handover for a communication in progress, the handover being from the unlicensed first wireless system to the licensed second wireless system; and
prior to effecting the handover, changing a cell identifier associated with a user terminal in conjunction with the handover of the communication in progress, wherein the cell identifier is changed from a cell identifier of a first region of the unlicensed first wireless system to a cell identifier of a second region of the unlicensed first wireless system.

14. The non-transitory computer-readable medium of claim 13, wherein the cell identifier associated with the user terminal is changed from a cell identifier corresponding to a service region of an access point of the unlicensed first wireless system to a cell identifier corresponding to a service region of an unlicensed network controller of the unlicensed first wireless system.

15. The non-transitory computer-readable medium of claim 14, the computer program further comprising a set of instructions for sending a message indicating that the handover has been performed from the cell identifier corresponding to the service region of the access point to the cell identifier corresponding to the service region of the unlicensed network controller.

16. The non-transitory computer-readable medium of claim 13, wherein the licensed second wireless system is one of a time division multiple access system, a code division multiple access system, a frequency division multiple access system, and a spatial division multiple access system.

17. The non-transitory computer-readable medium of claim 16, wherein the licensed second wireless system is a Global System for Mobile communications system, and the cell identifier associated with the user terminal is changed by forwarding a handover performed message from the unlicensed network controller to a mobile switching center, the mobile switching center providing an interface between the licensed second wireless system and the unlicensed first wireless system.

18. A non-transitory computer-readable medium storing a computer program for execution by a processor, the computer program for effecting a handover in an integrated wireless system comprising an unlicensed first wireless system and a licensed second wireless system, the computer program comprising sets of instructions for:
receiving a handover request to perform the handover for a communication in progress, the handover being from the licensed second wireless system to the unlicensed first wireless system; and
subsequent to effecting the handover, changing a cell identifier associated with a user terminal in conjunction with the handover of the communication in progress, wherein the cell identifier is changed from a cell identifier of a first region of the unlicensed first wireless system to a cell identifier of a second region of the unlicensed first wireless system.

19. The non-transitory computer-readable medium of claim 18, wherein the cell identifier associated with the user terminal is changed from a cell identifier corresponding to a service region of an unlicensed network controller of the unlicensed first wireless system to a cell identifier corresponding to a service region of an access point of the unlicensed first wireless system.

20. The non-transitory computer-readable medium of claim 19, wherein the cell identifier corresponding to the service region of the access point indicates a geographic location of the access point.

21. The non-transitory computer-readable medium of claim 20, the computer program further comprising a set of instructions for using the indicated geographic location of the access point to provide location based services to a user of the user terminal.

22. The non-transitory computer-readable medium of claim 19, the computer program further comprising a set of instructions for sending a message indicating that the handover has been performed from a cell associated with the unlicensed network controller to a cell associated with the access point.

23. The non-transitory computer-readable medium of claim 22, wherein the licensed second wireless system is a Global System for Mobile communications system, and the message is a handover performed message.

24. A wireless telecommunications system comprising:
a licensed first wireless system comprising one or more mobile switching centers, each mobile switching center communicatively coupled to at least one base station controller, each base station controller coupled to at least one base station transceiver system; and
an unlicensed second wireless system comprising one or more access points and an unlicensed network controller communicatively coupled to the licensed first wireless system through a particular mobile switching center, the unlicensed network controller communicatively coupled to at least one access point, wherein a handover of a communication in progress from the unlicensed second wireless system to the licensed first wireless system comprises, prior to effecting the handover, changing a cell identifier associated with a user terminal in conjunction with the handover, wherein the cell identifier is changed from a cell identifier of a first region of the unlicensed second wireless system to a cell identifier of a second region of the unlicensed second wireless system.

25. The wireless telecommunications system of claim 24, wherein the cell identifier associated with the user terminal is changed from a cell identifier corresponding to a service region of an access point of the unlicensed second wireless system to a cell identifier corresponding to a service region of the unlicensed network controller.

26. The wireless telecommunications system of claim 25, wherein a message indicating a completion of the handover from the cell identifier corresponding to the service region of the access point to the cell identifier corresponding to the service region of the unlicensed network controller, and the handover is initiated between the unlicensed second wireless system and the licensed first wireless system.

27. The wireless telecommunications system of claim 24, wherein the licensed first wireless system is one of a time division multiple access system, a code division multiple access system, a frequency division multiple access system, and a spatial division multiple access system.

28. The wireless telecommunications system of claim 27 wherein the licensed first wireless system is a Global System for Mobile communications system, and the cell identifier associated with the user terminal is changed by forwarding a handover performed message from the unlicensed network controller to the mobile switching center.

29. A wireless telecommunications system comprising:
a licensed first wireless system comprising one or more mobile switching centers, each mobile switching center communicatively coupled to at least one base station controller, each base station controller coupled to at least one base station transceiver system; and
an unlicensed second wireless system comprising one or more access points and an unlicensed network controller communicatively coupled to the licensed first wireless system through a particular mobile switching center, the unlicensed network controller communicatively coupled to at least one access point, wherein a handover of a communication in progress from the licensed first wireless system to the unlicensed second wireless system comprises, subsequent to effecting the handover, changing a cell identifier associated with a user terminal in conjunction with the handover, wherein the cell identifier is changed from a cell identifier of a first region of the unlicensed second wireless system to a cell identifier of a second region of the unlicensed second wireless system.

30. The wireless telecommunications system of claim 29, wherein the cell identifier associated with the user terminal is changed from a cell identifier corresponding to a service region of the unlicensed network controller of the unlicensed second wireless system to a cell identifier corresponding to a service region of an access point of the unlicensed second wireless system.

31. The wireless telecommunications system of claim 30, wherein the cell identifier corresponding to the service region of the access point indicates a geographic location of the access point.

32. The wireless telecommunications system of claim 31, wherein the indicated geographic location of the access point is used to provide location-based services to a user of the user terminal.

33. The wireless telecommunications system of claim 30, wherein a message is sent indicating that the handover has been performed from a cell associated with the whole unlicensed network controller to a cell associated with the access point.

34. The wireless telecommunications system of claim 33, wherein the licensed first wireless system is a Global System for Mobile communications system, and the message is a handover performed message.

* * * * *